United States Patent [19]
Gonthier et al.

[11] Patent Number: 5,119,453
[45] Date of Patent: Jun. 2, 1992

[54] WAVELENGTH-FLATTENED 2X2 SPLITTER FOR SINGLE-MODE OPTICAL WAVEGUIDES AND METHOD OF MAKING SAME

[75] Inventors: Francois Gonthier, Outremont; Denis Ricard, Montréal; Suzanne Lacroix, Verdun; Jacques Bures, Outremont, all of Canada

[73] Assignee: Ecole Polytechnique, Quebec, Canada

[21] Appl. No.: 680,736

[22] Filed: Apr. 5, 1991

[51] Int. Cl.⁵ .......................... G02B 6/26; C03B 23/20
[52] U.S. Cl. ...................................... 385/43; 385/42; 385/51; 65/4.2
[58] Field of Search ............... 350/96.10, 96.15, 96.16, 350/96.29, 96.30, 320; 65/4.1, 4.2, 4.3, 36; 385/43, 42, 46, 48, 96, 51; 356/345, 349, 351

[56] References Cited

U.S. PATENT DOCUMENTS

| | | | |
|---|---|---|---|
| 4,768,850 | 9/1988 | Moslehi et al. | 350/96.15 |
| 4,801,185 | 1/1989 | Bricheno | 385/43 |
| 4,822,126 | 4/1989 | Sweeny et al. | 385/43 |
| 4,842,359 | 6/1989 | Imoto et al. | 385/46 |
| 4,869,570 | 9/1989 | Yokohama et al. | 385/43 |
| 4,900,119 | 2/1990 | Hill et al. | 350/96.15 |
| 4,978,188 | 12/1990 | Kawachi et al. | 385/14 X |
| 4,979,790 | 12/1990 | Walker | 350/96.15 |
| 4,997,248 | 3/1991 | Stowe | 350/96.15 |

Primary Examiner—Brian Healy
Attorney, Agent, or Firm—Longacre & White

[57] ABSTRACT

The optical waveguide coupler device is formed on two laterally adjacent optical fibers for splitting with wavelength-flattened ratios an incident light intensity into the two fibers. Adjacent sections of the two fibers are fused together and first and second concatenated tapered portions are formed. These two tapered portions are separated by a central optical waveguide portion including two parallel branches of slightly different lengths, each capable of propagating a light signal from either tapered portion to the other. The first and second tapered portions define optical waveguide couplers presenting coupling ratios varying with optical wavelength in accordance with different curves. The different lengths of the two parallel branches of the central portion cause a shift $\phi$ between the phases of the optical signals propagating through these two branches. The coupling ratios of the tapered portions and the phase shift $\phi$ are selected to wavelength-flatten the coupling ratios of the coupler device.

17 Claims, 4 Drawing Sheets

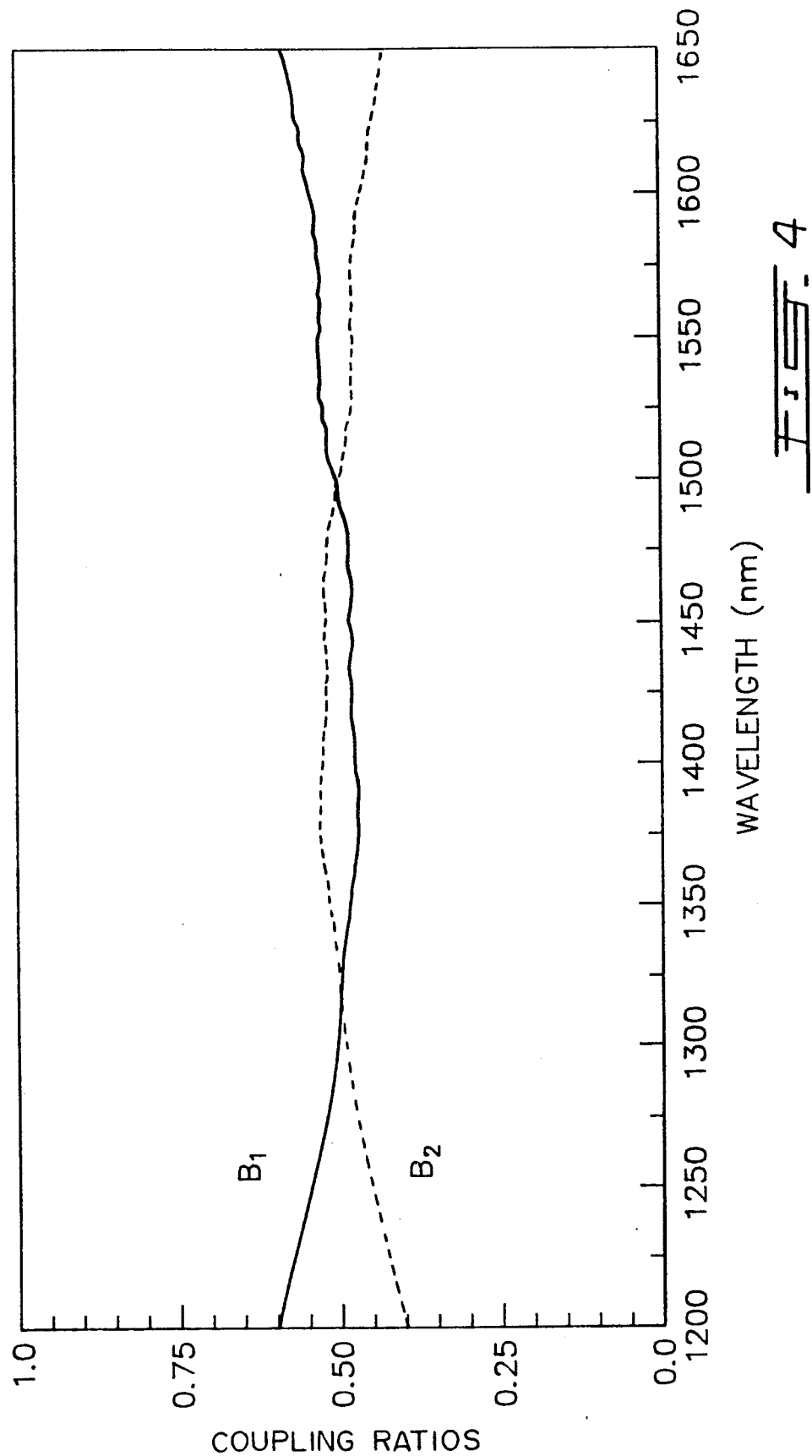

WAVELENGTH-FLATTENED 2X2 SPLITTER FOR SINGLE-MODE OPTICAL WAVEGUIDES AND METHOD OF MAKING SAME

BACKGROUND OF THE INVENTION

1. Field of the invention

The present invention relates to an optical waveguide coupler device presenting the general configuration of a slightly unbalanced MachZehnder interferometer. The present invention also extends to a method for forming such a coupler device on laterally adjacent optical waveguides.

2. Brief description of the Prior Art

Tapered 2×2 couplers formed by fusing together sections of two laterally adjacent optical fibers and by subsequently stretching these fused sections, are well known and versatile devices that can be used in many applications where given coupling ratios at a given wavelength of the propagated light signal is required.

These couplers generally present good performances; they have small dimensions, cause low losses, present good thermal stability, and can be easily and rapidly produced.

The prior art all-fiber fused couplers used as power splitters are sensitive to optical wavelength. Indeed, their coupling ratios are dependent on the wavelength which is itself directly dependent on the degree of stretching and the outline of the coupler.

Wavelength dependent couplers are useful in wavelength multiplex communication systems which simultaneously transmit a plurality of messages on a single fiber. Indeed, these communication systems require couplers capable of separating light signals of different wavelengths (for example the currently used 1300 and 1550 nm wavelengths). However, wavelength independent couplers are required for example when the light source used in a communication system has a relatively wide spectral bandwidth.

To flatten the wavelength response of such a coupler, it is known to fuse and stretch two optical fibers of different diameters or two identical fibers made dissymetric by pretapering or etching of one of them. Production of these couplers is however complicated by the dissymetry of the fibers, and by the accurate control required by the pretapering or etching.

OBJECTS OF THE INVENTION

A first object of the present invention is therefore to provide a wavelength-flattened optical waveguide coupler device presenting the general configuration of a slightly unbalanced Mach-Zehnder interferometer.

Another object of the invention is to propose a method for easily and rapidly fusing this wavelength-flattened coupler device on laterally adjacent, identical optical fibers.

SUMMARY OF THE INVENTION

More specifically, the present invention relates to an optical waveguide coupler device arranged on two laterally adjacent optical waveguides for splitting with wavelength-flattened coupling ratios the intensity of an incident optical signal, propagating in either one of the waveguides, into these two waveguides. The device of the invention comprises:

a first optical waveguide coupler characterized by first coupling ratios varying with optical wavelength;

a second optical waveguide coupler concatenated with the first coupler and characterized by second coupling ratios also varying with optical wavelength, the first coupling ratios and the second coupling ratios varying with optical wavelength according to different curves; and a central optical waveguide portion (a) interposed between the first and second couplers, (b) comprising first and second parallel branches each propagating, in response to the incident signal, an optical signal from one of the first and second couplers to the other of these couplers, and (c) structured to cause a shift $\phi$ between the phase of the optical signal propagating through the first branch and the phase of the optical signal propagating through the second branch.

In accordance with the present invention, the first and second coupling ratios and the phase shift $\phi$ are selected to wavelength-flatten the coupling ratios of the coupler device.

As will be discussed in detail in the following description, the phase shift $\phi$ enable construction of a coupler device of which the coupling ratios are wavelength-flattened.

In preferred embodiments of the coupler device of the invention, the first coupling ratios are function of a parameter $\alpha$, the second coupling ratios are function of a parameter $\beta$, the phase shift $\phi$ is approximately equal to $\pi$, and the wavelength-flattened coupling ratios are function of the difference $\alpha - \beta$ which is essentially independent from wavelength.

In other preferred embodiments of the present invention, the waveguides are single-mode optical waveguides, and the first and second branches have different lengths to cause the phase shift $\phi$.

An optical waveguide coupler device in accordance with the present invention can be formed on two laterally adjacent optical fibers. Then, the first and second couplers each comprise a tapered portion formed of sections of the two fibers fused together and subsequently stretched, the fibers being identical single-mode optical fibers.

The present invention also relates to a method of forming an optical waveguide coupler device on two laterally adjacent optical fibers, comprising the steps of (a) fusing adjacent sections of the two fibers together, (b) forming in the fused fiber sections a first tapered portion, (c) forming in the fused fiber sections a second tapered portion concatenated with the first one, and (d) forming in the fused fiber sections and between the first and second tapered portions a central optical waveguide portion. This central portion comprises two parallel branches each capable of propagating a light signal from either tapered portion to the other tapered portion, these branches having different lengths.

The tapered portion forming steps may comprise stretching the fused fiber sections, while the central portion forming step may comprise bending the central waveguide portion to make the lengths of the branches different. Preferably, the central portion is bent in a plane in which the longitudinal axes of the fibers are lying.

In the present specification and in the appended claims, (a) the terms "optical" and "light" are intended to relate to visible and invisible light, (b) the expression "wavelength-flattened" indicates that the coupling ratios of concern do not vary by more than a small percentage over the desired range of wavelengths, and (c)

the term "branch" relates to each optical waveguide or each light path in the individual couplers and central waveguide portion corresponding to one of these optical waveguides.

The objects, advantages and other features of the present invention will become more apparent upon reading of the following non restrictive description of a preferred embodiment thereof, given by way of example only with reference to the accompanying drawings.

BRIEF DESCRIPTION OF THE DRAWINGS

In the appended drawings:

FIG. 4 is a graph showing the variation of the coupling ratios $B_1$ and $B_2$ with wavelength in a coupler device in accordance with the present invention, presenting the general configuration of a Mach-Zehnder interferometer slightly unbalanced to flatten the wavelength response over a range including the wavelengths of 1300 and 1550 nm currently used in communication systems.

DETAILED DESCRIPTION OF THE PREFERRED EMBODIMENT

Figure 1:
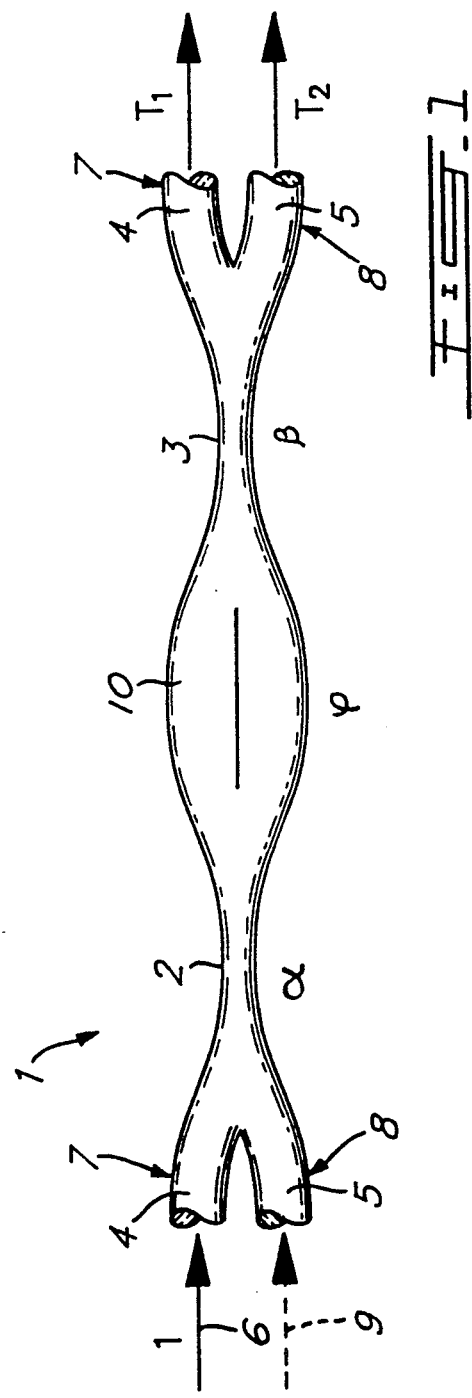
FIG. 1 represents a fused all-fiber 2×2 coupler device in accordance with the present invention.

As illustrated in FIG. 1 of the appended drawings, a wavelength-flattened 2×2 tapered fused coupler device according to the present invention, generally identified by the reference numeral 1, consists of two individual tapered couplers arranged in series in a slightly unbalanced all-fiber compact Mach-Zehnder interferometer.

More specifically, the coupler device 1 is formed of a pair of concatenated all-fiber fused individual couplers 2 and 3 formed on a pair of identical, single-mode optical fibers 4 and 5. As well known in the art, each coupler 2,3 is formed of all-fiber concatenated tapered portions separated by an all-fiber optical waveguide central portion 10.

The splitting of the intensity of an incident light signal in the coupler device 1 is ruled by the following laws.

For the individual coupler 2, one skilled in the art knows that, for an incident light signal 6 of normalized intensity ($=1$) in the main branch 7 (fiber 4), the outgoing transmission $T_{11}$ in the main branch 7 and the outgoing transmission $T_{21}$ in the secondary branch 8 (fiber 5) are given by the following equations:

$$T_{11} = \cos^2 \alpha \quad (1)$$

$$T_{21} = 1 - T_{11} \quad (2)$$

where $$\alpha = \int_0^{L_1} C_1 \, dz$$

is defined to be half the $LP_{01}$ and $LP_{11}$ supermode phase shift, accumulated over the length $L_1$ of the coupler 2. $C_1$ is the coupling coefficient of coupler 2 (or equivalently half the coupler supermode propagation constant difference).

Similarly, considering that only the individual coupler 3 is formed on the laterally adjacent fibers 4 and 5, an incident luminous intensity such as 6 will produce an outgoing transmission $T_{12}$ in the main branch 7 and an outgoing transmission $T_{22}$ in the secondary branch 8 given by the following equations:

$$T_{12} = \cos^2 \beta \quad (3)$$

$$T_{22} = 1 - T_{12} \quad (4)$$

where $$\beta = \int_0^{L_2} C_2 \, dz$$

is again defined to be half the $LP_{01}$ and $LP_{11}$ supermode phase shift, accumulated over the length $L_2$ of the couplder 3. $C_2$ is half the coupler supermode propagation constant difference.

Usually, $\alpha$ for the coupler 2 and $\beta$ for the coupler 3 can be considered as varying linearly with the wavelength $\lambda$ of the light transmitted so that the coupler transmission $\cos^2 \alpha$ (or $\beta$) varies sinusoidally with optical wavelength. $\alpha$ and $\beta$ are also sensitive, to some extent, to the polarization of the light and to the ambient temperature.

Assuming no loss and that optical power is launched in the main branch 7, the transmission in this branch by the entire coupler device 1, presenting the general configuration of a slightly unbalanced Mach-Zehnder interferometer is given by the following equation:

$$T_1 \frac{1}{2}[1 + \cos 2\alpha \cos 2\beta - \sin 2\alpha \sin 2\beta \cos \alpha] \quad (5)$$

in which $\alpha$ and $\beta$ characterize as explained hereinabove the coupling coefficients of the individual couplers 2 and 3, respectively, and $\phi$ is a shift of the respective phases of the light signals propagating in the main 7 and secondary 8 branches in the central portion 10 caused by a slight difference in length of these two branches in this central portion (this corresponds to a slight unbalance of the Mach-Zehnder interferometer). In the case of a balanced MachZehnder interferometer, $\phi = 0$.

Concerning the transmission in the secondary branch 8, it is again given by the equation:

$$T_2 = 1 - T_1 \quad (6)$$

One can appreciate that the particular values $$\alpha = \pi/2i + n\pi/2$$

and $$\beta = \pi/4 + n' \pi/2$$

where n and n' are integers, make $T_1$ and T equal to $\frac{1}{2}$ whatever the value of $\phi$. However, assuming no loss and initial power in the main branch 7, the transmission $T_1$ in the coupler device 1, for different values of $\alpha$ and $\beta$, depends on $\phi$ according to the following equation:

$$T_1 = \frac{1}{2}[1+\cos 2(\alpha+\beta)] \text{ when } \phi=2p\ \phi,\ p=0,1,2,3, \quad (7)$$

$$T_1 = \frac{1}{2}[1+\cos 2(\alpha-\beta)] \text{ when } \phi=(2p+1)\ \phi,\ p=0,1,2,3, \quad (8)$$

The transmissions of equation (7) are identical to those of individual couplers characterized by $\alpha+\beta$, while the transmissions of equation (8) are identical to those of individual couplers characterized by $\alpha-\beta$. When the sinusoidal variations of the coupling ratios of the couplers 2 and 3 with wavelength have the same period but are out of phase, the difference $\alpha-\beta$ is approximately constant as a function of wavelength even though $\alpha$ and $\beta$ characterizing the individual couplers is sensitive to this parameter. Although it is experimentally difficult to obtain exactly the same period for two different coupling ratios ($\alpha \neq \beta$), one can approximately achieve it in a certain range of wavelengths $\lambda_1$, $\lambda_2$. The best choice to obtain a wavelength independent 50/50 splitter is then to have a minimum phase shift ($\phi \approx \pi$) equation (8) together with the condition:

$$|\alpha-\beta| = \pi/4 \quad (9)$$

with $n=n'\lambda 0$ at an average wavelenght $\lambda=(\lambda_1+\mu_2)/2$. It is interesting to note that a detuning of $\delta\phi$ from the value $\phi=\pi$ will affect the transmission $T_1$ only to the second order $(\delta\phi)^2$. Although in this particular example a splitting ratio of $\frac{1}{2}$ is chosen, which corresponds to $\alpha-\beta=\phi/4$, this splitting ratio can be fixed to any arbitrary value $T_1\%/(1-T_1)\%$ by appropriately selecting $\alpha-\beta$ as shown by equation (8). For example, when $\alpha-\beta=0$ is selected, all the optical power is transferred to the main branch 7, while choosing $\alpha-\beta=\phi/2$ achieves a complete transfer of power in the secondary branch 8. Even though the couplers 2 and 3 are polarization sensitive, the condition of equation (9) can be realized simultaneously for the two polarizations in the two couplers 2 and 3 thereby making the transmission through the entire coupler device 1 less polarization dependent in comparison with that of an individual coupler 2,3; this also applies to temperature although the final performance will greatly depend on the packaging of the device 1.

Figure 2:
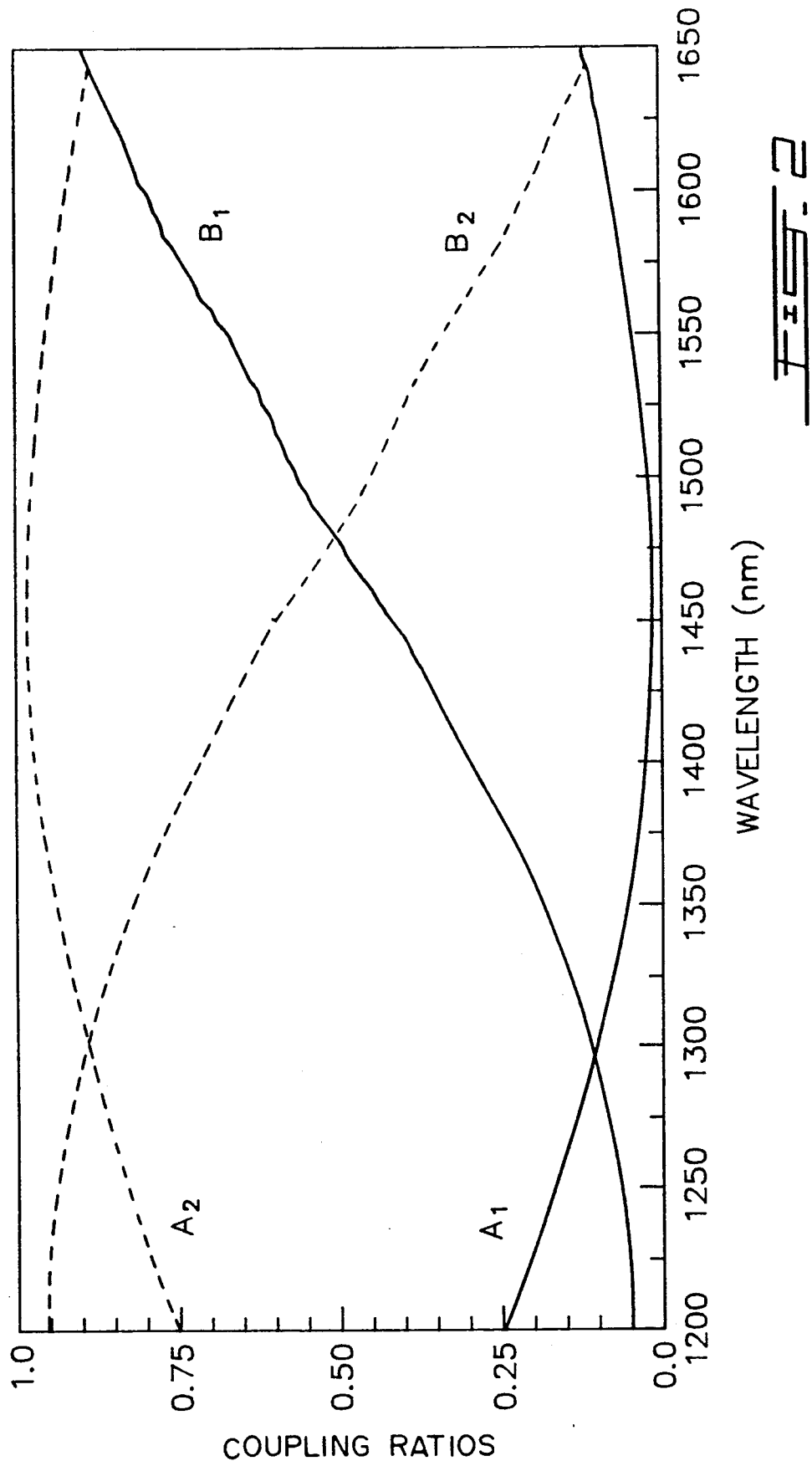
FIG. 2 is graph showing the variation with wavelength of the coupling ratios $A_1$ and $A_2$ in the main and secondary branches of a conventional fused and tapered coupler characterized by $\alpha = \pi/2$ at $\alpha_\lambda = 1450$ nm, and of the coupling ratios $B_1$ and $B_2$ in the main and secondary branches of a balanced Mach-Zehnder interferometer ($\phi = 0$) consisting of two couplers in series.

Identical standard matched-cladding telecommunication fibers were used to make a 50/50 coupler device in accordance with the present invention flattened over a range of wavelengths, including 1300 and 1550 nm. A balanced Mach-Zehnder interferometer with $\phi=0$ and with two individual couplers fulfilling the condition of equation (9) was first formed on the fibers. The transmission of this interferometer is given by equation (7). In order to facilitate the production of the coupler device, $\alpha=\phi/2$ was choosen, which corresponds to a complete transfer of power from the main 7 to the secondary 8 branch, and $\beta=\phi/4$ for which half the power is transferred from the main 7 to the secondary 8 branch. FIG. 2 shows the coupling ratios $A_1$ and $A_2$ in the main 7 and secondary 8 branches for the first coupler 2 ($\alpha=\phi/2$ at $\pi_0=1450$ nm), and the coupling ratios $B_1$ and $B_2$ in the main 7 and secondary 8 branches for the set of two couplers 2 and 3 concatenated to form a balanced Mach-Zehnder interferometer ($\phi=0$). In the latter case, the output is identical to that of a single coupler characterized by $\alpha+\beta$, so that the parameter $\beta=\phi/4$ of the second coupler 3 at $\pi_0$ should lead to a 50/50 transmission at this particular wavelength (equation (5)). One can see in FIG. 2 that the 3 dB crossing point occurs at 1480 nm instead of 1450 nm initially selected, meaning that the second coupler 3 is slightly underelongated.

In order to form the Mach-Zehnder interferometer on the two laterally adjacent optical fibers 4 and 5, adjacent sections of these fibers were fused together and stretched to taper the fused fiber sections. These fused fiber sections were fused and stretched again to form the left and right tapered portions (couplers 2 and 3), and accordingly form the central portion 10.

Figure 3:
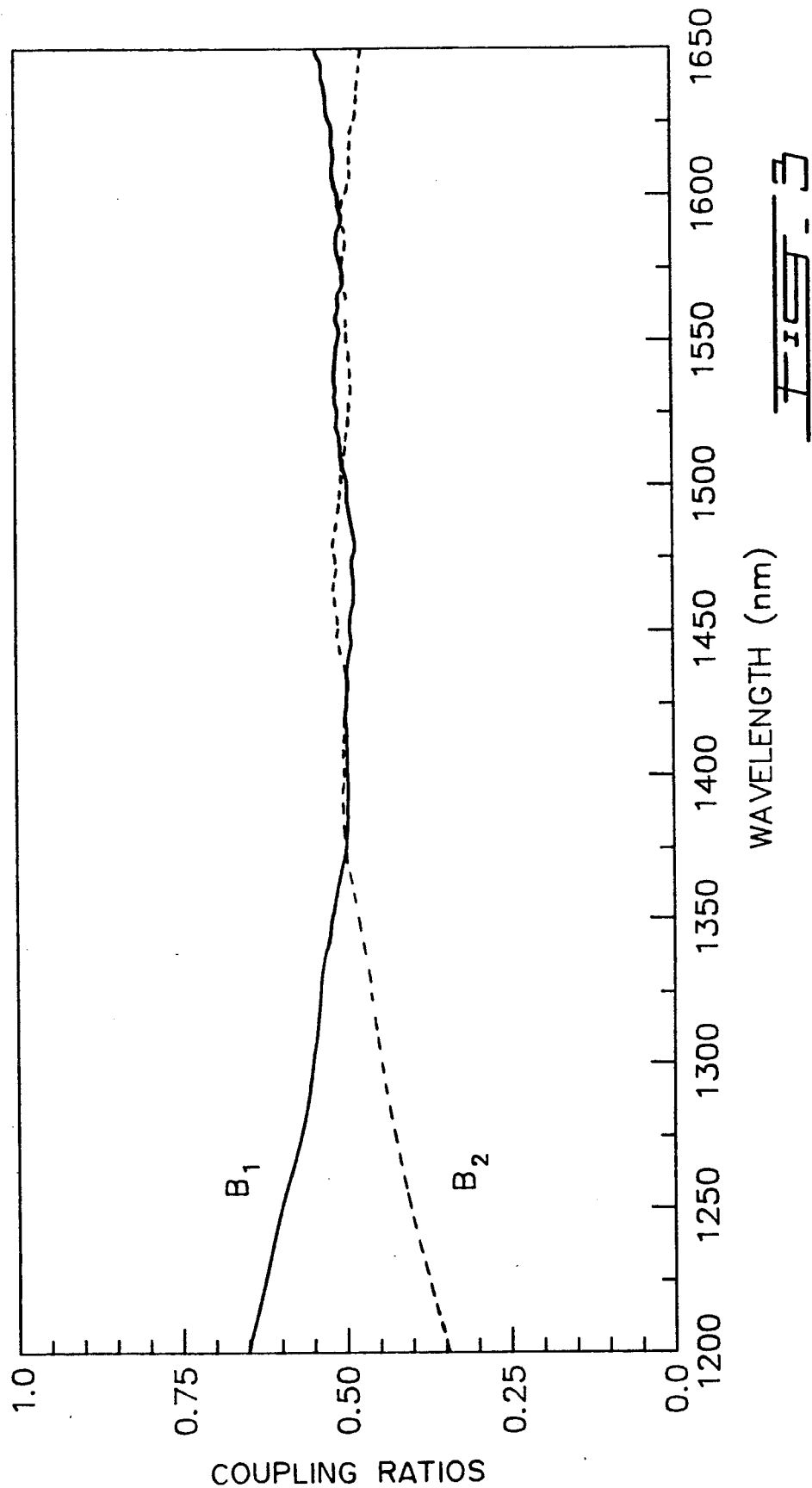
FIG. 3 is a graph showing the variation of the coupling ratios $B_1$ and $B_2$ with wavelength in a 2×2 coupler device according to the present invention, having the general configuration of a Mach-Zehnder interferometer unbalanced ($\phi \approx \pi$) to flatten as much as possible the wavelength response around 1450 nm.

In order to unbalance the Mach-Zehnder interferometer, the central portion 10 was bent in the plane containing the axes of the fibers until the lengths of the main 7 and secondary 8 branches were different enough to obtain the desired transmission. The fibers can be heated to carry out this bending. FIG. 3 shows the coupling ratios $B_1$ and $B_2$ of the unbalanced Mach-Zehnder interferometer causing a phase shift $\phi=\pi$ in the central portion 10. This phase shift was increased by bending to obtain a wavelength response as flat as possible (coupling ratios B and $B_2$ of $50\pm1.5\%$ over a range of 250 nm around the wavelength $\phi=1450$ nm). FIG. 4 shows results obtained with a phase shift $\phi=\pi$ and $\alpha-\beta=\pi/4$. The deviation of the coupling ratios $B_1$ and $B_2$ from an ideal 50% is $\pm2.5\%$ over a range of 300 nm including the wavelengths 1300 and 1550 nm. The measured excess loss was lower than 0.1 dB which is comparable to that of individual fused couplers such as 2 and 3. Fulfilling exactly the condition of equation (9) at a given wavelength $\lambda_0$ and choosing this wavelength at mid-distance between 1300 and 1550 nm should improve the result. However, despite these experimental imperfections, the coupler device 1 in accordance with the present invention shows better performances than those obtained with dissimilar fibers and is more easily produced.

The coupler device of the present invention is compact ($\approx 2$ cm) and can be used to build, in particular but not exclusively, splitters, polarization and mode independent couplers, and broadband all-fiber loop reflectors. It can also be applied to integrated optics and to the optical waveguides in general.

In the foregoing description, reference is made to an incident light intensity 6 propagating in the main branch 7. Obviously, the same principles apply to an incident light intensity propagating in the secondary branch 8 (see 9 in FIG. 1).

Although the present invention has been described hereinabove by way of a preferred embodiment thereof, this embodiment can be modified at will, within the scope of the appended claims, without departing from the spirit and nature of the subject invention. For example, one can form on the laterally adjacent fibers 4 and 5 a single tapered portion (forming an individual coupler characterized by $\alpha+\beta$) and bend this tapered portion in a given region thereof to thereby obtain a coupler device operating like a slightly unbalanced Mach-Zehnder interferometer. The bent region then corresponds to the central portion 10 of FIG. 1.

What is claimed is:

1. An optical waveguide coupler device arranged on two laterally adjacent optical waveguides for splitting with wavelength-flattened coupling ratios the intensity of an incident optical signal, propagating in either one of the waveguides, into the said two waveguides, comprising:
- a first optical waveguide coupler characterized by first coupling ratios varying with optical wavelength;
- a second optical waveguide coupler concatenated with said first coupler and characterized by second coupling ratios also varying with optical wavelength, said first coupling ratios and said second coupling ratios varying with optical wavelength according to different curves; and
- a central optical waveguide portion (a) interposed between said first and second couplers, (b) comprising first and second generally parallel branches each propagating, in response to said incident signal, an optical signal from one of said first and second couplers to the other of these couplers, and (c) structured to cause a shift $\phi$ between the phase of the optical signal propagating through the first branch and the phase of the optical signal propagating through the said second branch;

wherein the first and second coupling ratios and the phase shift $\phi$ are selected to wavelength-flatten the said coupling ratios of the coupler device.

2. A coupler device as recited in claim 1, wherein said first coupling ratios are function of a parameter $\alpha$, said second coupling ratios are function of a parameter $\beta$ and said wavelength-flattened coupling ratios are function of the difference $\alpha - \beta$.

3. A coupler device as recited in claim 1, wherein the said phase shift $\phi$ is approximately equal to $\pi$.

4. A coupler device as recited in claim 2, wherein $\phi \approx \pi$, $\alpha \approx \phi/4$, and $\beta \approx \pi/2$, and wherein said wavelength-flattened coupling ratios are 50/50.

5. A coupler device as recited in claim 1, wherein the said waveguides are single-mode optical waveguides.

6. A coupler device as recited in claim 1 wherein said first and second branches have different lengths to cause said phase shift $\phi$.

7. An optical waveguide coupler device formed on two laterally adjacent optical fibers for splitting with wavelength-flattened coupling ratios the intensity of an incident light signal, propagating in either one of the fibers, into the said two fibers, comprising:
- a first optical waveguide coupler characterized by first coupling ratios varying with optical wavelength;
- a second optical waveguide coupler concatenated with said first coupler and characterized by second coupling ratios also varying with optical wavelength, said first coupling ratios and said second coupling ratios varying with optical wavelength according to different curves; and
- a central optical waveguide portion (a) interposed between said first and second couplers, (b) comprising first and second parallel branches each propagating, in response to said incident signal, a couplers to the other of these couplers, and (c) structured to cause a shift $\phi$ between the phase of the light signal propagating through the first branch and the phase of the light signal propagating through the said second branch;

wherein the first and second coupling ratios and the phase shift $\phi$ are selected to wavelength-flatten the said coupling ratios of the said coupler device.

8. A coupler device as recited in claim 7, in which said first and second couplers each comprise a tapered portion formed of sections of said two fibers fused together and subsequently stretched.

9. A coupler device as recited in claim 8, wherein said first and second branches of the central portion have different lengths to cause said phase shift $\phi$.

10. A coupler device as recited in claim 8, wherein said first coupling ratios are function of a parameter $\alpha$, said second coupling ratios are function of a parameter $\beta$, and said wavelength-flattened coupling ratios are function of the difference $\alpha - \beta$.

11. A coupler device as recited in claim 8, wherein the said phase shift $\phi$ is approximately equal to $\pi$.

12. A coupler device as recited in claim 10, wherein $\phi \approx \pi$, $\pi \approx \pi/4$, and $\beta \approx \pi/2$, and wherein said wavelenght-flattened coupling ratios are 50/50.

13. A coupler device as recited in claim 10, wherein the said wavelenght-flattened coupling ratios are function of the following expression:

$$\tfrac{1}{2}[1 + \cos 2(\alpha - \beta)].$$

14. A coupler device as recited in claim 8, in which the said two optical fibers are identical single-mode optical fibers.

15. A method of forming an optical waveguide coupler device on two laterally adjacent optical fibers, comprising the steps of:
- fusing adjacent sections of said two fibers together;
- forming in said fused fiber sections two concatenated tapered portions defining between them a central optical waveguide portion comprising two generally parallel branches each capable of propagating a light signal from either one of the two tapered portions to the other of said tapered portions, said branches having a same length; and
- adjusting the length of at least one of the two branches to obtain a length difference between said branches which shifts by an angle approximately equal to $\pi$ the relative phase of light signals respectively propagating in the two branches.

16. The method of claim 15, in which the length adjusting step comprises bending the said central waveguide portion to make the lengths of said branches different.

17. The method of claim 16, wherein each optical fiber has a longitudinal axis, and wherein said central portion is bent in a plane in which the longitudinal axes of the fibers are lying.

* * * * *